US010336203B2

(12) United States Patent
Kilic et al.

(10) Patent No.: US 10,336,203 B2
(45) Date of Patent: Jul. 2, 2019

(54) CHARGING/DISCHARGING STATION, IN PARTICULAR FOR A BATTERY-OPERATED VEHICLE

(71) Applicant: Robert Bosch GmbH, Stuttgart (DE)

(72) Inventors: Ahmet Kilic, Boeblingen (DE); Steffen Eppler, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 70 days.

(21) Appl. No.: 15/528,943

(22) PCT Filed: Sep. 28, 2015

(86) PCT No.: PCT/EP2015/072250
§ 371 (c)(1),
(2) Date: May 23, 2017

(87) PCT Pub. No.: WO2016/082978
PCT Pub. Date: Jun. 2, 2016

(65) Prior Publication Data
US 2017/0253131 A1    Sep. 7, 2017

(30) Foreign Application Priority Data
Nov. 25, 2014  (DE) .................. 10 2014 223 931

(51) Int. Cl.
*H02J 7/00*   (2006.01)
*B60L 11/18*  (2006.01)
(Continued)

(52) U.S. Cl.
CPC ............. *B60L 11/182* (2013.01); *B60L 53/12* (2019.02); *B60L 53/305* (2019.02); *B60L 53/37* (2019.02);
(Continued)

(58) Field of Classification Search
USPC ................. 320/108, 107, 109, 110
See application file for complete search history.

(56) References Cited

U.S. PATENT DOCUMENTS 9,581,997 B1 *   2/2017  Penilla .............. G05D 1/0011
2012/0236149 A1 * 9/2012  Nagy ................. E04H 6/426
                                                 348/148
(Continued)

FOREIGN PATENT DOCUMENTS

DE   102007003458   7/2008
DE   202010007613   10/2010
(Continued)

OTHER PUBLICATIONS

International Search Report for Application No. PCT/EP2015/072250 dated Jan. 8, 2016 (English Translation, 3 pages).

*Primary Examiner* — Brian Ngo
(74) *Attorney, Agent, or Firm* — Michael Best & Friedrich LLP

(57) ABSTRACT

The invention relates to a charging/discharging station (2) for charging or discharging an at least partly battery-operated vehicle (14) via an inductively coupled pair of coils. The charging/discharging station (2) comprises in particular a computer device (12), in which spatial coordinates of parking areas (4) are stored and which has means to navigate a vehicle (14) to the parking area (4) by means of communication units (8, 16) by using image data of the vehicle (14) recorded by means of a camera device (10) and by using physical coordinates of the parking areas (4). The invention further relates to a method for operating such a loading/discharging station (2).

11 Claims, 3 Drawing Sheets

(51) Int. Cl.
  *B60L 53/12* (2019.01)
  *B60L 53/39* (2019.01)
  *B60L 53/37* (2019.01)
  *B60L 55/00* (2019.01)
  *B60L 53/30* (2019.01)

(52) U.S. Cl.
  CPC ............... *B60L 53/39* (2019.02); *B60L 55/00* (2019.02); *B60L 2240/62* (2013.01); *B60L 2240/72* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01); *Y02T 90/16* (2013.01)

(56) References Cited

U.S. PATENT DOCUMENTS

2014/0092236 A1\* 4/2014 Findeisen .......... G06K 9/00791
  348/118
2014/0092243 A1 4/2014 Ichikawa

FOREIGN PATENT DOCUMENTS

| DE | 102011109834 | 2/2013 |
| DE | 102012205400 | 10/2013 |
| DE | 102013206587 | 10/2014 |
| WO | 2014157094 | 10/2014 |

\* cited by examiner

CHARGING/DISCHARGING STATION, IN PARTICULAR FOR A BATTERY-OPERATED VEHICLE

BACKGROUND OF THE INVENTION

The invention relates to a charging/discharging station for charging or discharging an at least partially battery-operated vehicle via an inductively coupled pair of coils. A method for operating such a charging/discharging station is also provided.

As an alternative to charging or discharging using a cable (so-called conductive charging), inductive charging is an innovative solution for charging or discharging at least partially battery-operated vehicles, in particular electric vehicles. Inductive charging does not require any intervention by the vehicle user, that is to say a plug does not have to be inserted in particular, and there is a certain amount of protection against weathering influences and vandalism since the relevant components, in particular a primary coil, can be inaccessibly embedded in the road surface or can be included in a charging plate placed on the road surface. The primary coil is connected to the power supply system by means of suitable electronics. A secondary coil is typically permanently mounted in the underbody of the vehicle and is in turn connected to the vehicle battery by means of suitable electronics. In order to transmit energy, the primary coil generates a high-frequency alternating magnetic field which permeates the secondary coil and induces a corresponding current there. Since the power which can be transmitted is typically scaled linearly with the switching frequency and the switching frequency is limited by the control electronics and by losses in the transmission path, a frequency range of approximately 20 to 150 kHz results.

During inductive charging, energy is transmitted via the air gap between the coils. In order to transmit energy as efficiently as possible, the highest possible degree of coupling between the two coils is required. With an increasing offset between the coils, the losses increase and the efficiency is reduced. In addition, a strong stray field, a field which emits freely and is not caught by a receiving coil, that is to say the secondary coil, may result in health risks and safety problems. A central challenge with inductive charging is therefore that of positioning the primary coil and the secondary coil in an optimum manner with respect to one another.

SUMMARY OF THE INVENTION

An object of the invention is to provide a positioning accuracy of less than 10 cm, for example. Another object is to exactly position the vehicle and therefore the coils by means of a small amount of technical effort.

The invention provides a charging/discharging station for charging or discharging an at least partially battery-operated vehicle via an inductively coupled pair of coils. The charging/discharging station has at least one parking space with a primary coil, the primary coil being able to form the inductively coupled pair of coils together with a secondary coil of a vehicle to be discharged and/or charged. The charging/discharging station also has a first communication unit which is set up to communicate with a second communication unit of the vehicle. In this case, the charging/discharging station has at least one camera device which is connected to a computer device for the purpose of processing recorded image data. The computer device stores the spatial coordinates of the parking space(s). The computer device also has means for navigating the vehicle to the parking space or to one of the parking spaces on the basis of image data relating to the vehicle which are recorded by the camera device and the spatial coordinates of a parking space by means of the first and second communication units.

In this case, the primary coil of the charging/discharging station is preferably permanently installed and is provided with an adapted electronic unit which is connected to a power supply system. In this case, the primary coil is arranged in such a manner that it can form an inductively coupled pair of coils with the secondary coil of the vehicle. In this case, the secondary coil of the vehicle is provided, for example, on the vehicle roof, on a side of the vehicle, in particular at the front of the vehicle or at the rear, for example on the license plate, in which case installation in the vehicle underbody is preferred. Installation of the secondary coil in the vehicle underbody is advantageous on account of the associated requirements imposed on bending strength, stiffness, pull-out forces, vibration properties, load-bearing capacity, heat input, aerodynamics, acoustics, heat insulation and/or water absorption.

The charging/discharging station is assigned at least one camera device which is connected to a computer device, for example a server, a PC, a mobile device, etc. Communication takes place, for example, by means of radio signal or Bluetooth, by means of WIFI2CAN or by means of any desired wireless communication connections.

The computer device stores the spatial coordinates of the parking space(s). In this case, it is possible to provide systems which learn the coordinates of the primary coils, that is to say which know the exact spatial position of all primary coils in the monitoring area even if they are not directly visible, for example if they are embedded in the ground or are covered by snow.

According to one embodiment, the camera is installed together with the primary coil in a charging pad. Since the charging pad is typically arranged in an area accessible to persons, for example in the area of the ground, there is the risk of soiling and damage caused by vandalism in this case. According to an alternative embodiment, the camera device is arranged in an operating device of the charging/discharging station. Such operating devices may be set up, for example, to control the charging/discharging functions or to communicate with the vehicle.

According to one preferred embodiment, the camera device is therefore positioned with respect to the parking space in such a manner that a plan view of the parking space is possible in principle. In this case, possible approach routes of the vehicle are preferably also visible, that is to say the viewing direction of the camera preferably captures the approach route of the vehicle. In particular, positioning is preferred which is outside the reachability of users, for example on a roof or at a height of several meters on a wall. In this case, "in principle" means that vehicles which have already been parked or vehicles being parked or persons in the charging station can prevent the plan view of the parking space from being possible.

In one embodiment of the invention, the camera device may be arranged in such a manner that the primary coil is not in its capture range, that is to say the camera device does not see the primary coil. Since the computer device stores the spatial coordinates of the parking space(s), there is no need to have a view of the primary side in order to calculate the trajectory and transmit the target coordinates.

The camera device may be formed by stereo cameras, for example. One embodiment may provide for the camera to be movable, in particular to fly autonomously. In this case, the charging/discharging station comprises a so-called drone which can have the camera device, a communication unit and, in particular, also the computer device and is set up to communicate with the vehicle and preferably also with the electronics for operating the primary coil.

According to one embodiment, the charging/discharging station has a plurality of parking spaces, each parking space being assigned at least one such camera device. This makes it possible to exactly monitor a plurality of parking spaces. Alternatively, and for reasons of costs, a plurality of parking spaces can preferably be monitored by means of common camera devices, culminating in precisely one centrally arranged camera for all parking spaces.

The invention also proposes a computer program, according to which one of the methods described herein is carried out, the computer program being executed on a programmable computer device. The computer program may be, for example, a software module, a software routine or a software subroutine for implementing a charging system having a battery-operated vehicle and a charging/discharging station. The computer program may be stored in the battery-operated vehicle, in the charging/discharging station or in a manner distributed among these, in particular on permanent or rewritable machine-readable storage media or in assignment to a computer device, for example in a portable memory such as a CD-ROM, a DVD, a Blu-ray disc, a USB stick or a memory card. Additionally or alternatively, the computer program may be provided on a computer device, for instance a server or a cloud server, for downloading, for example via a data network such as the Internet or via a communication connection, for instance a telephone line or a wireless connection.

Another aspect of the invention provides a method for operating a charging/discharging station for charging or discharging an at least partially battery-operated vehicle via an inductively coupled pair of coils, this then being able to be one of the charging/discharging stations described, in particular. Accordingly, features described within the scope of the method accordingly apply to the system and conversely the features described within the scope of the system accordingly apply to the method.

In the method, the following steps are provided, in particular:
a) determining and storing spatial coordinates of the parking space(s) of the charging/discharging station in the computer device,
b) identifying the vehicle and detecting a current position of the vehicle with respect to one or more parking spaces of the charging/discharging station by means of image data relating to the vehicle which are recorded by the camera device, and
c) navigating the vehicle to a parking space on the basis of the detected current position of the vehicle and the spatial coordinates of the parking space by means of the first and second communication units.

In this case, the process of determining and storing spatial coordinates of the parking space(s) of the charging/discharging station in the computer device is an initialization step which need not necessarily be carried out during each individual charging or discharging process. In particular, provision may be made for a multiplicity of vehicles to be identified according to step b) in the charging/discharging station after step a) and to be navigated to parking spaces according to step c). In contrast, in the case of movable parking spaces or movable primary coils, provision may also be made for the initialization step a) to be carried out during each individual charging or discharging process.

In particular, provision may also be made for an item of corresponding information to be transmitted to such a charging/discharging station, for example by means of radio signal, if a driver wishes to charge or discharge his vehicle, the method according to b) and c) being carried out as the vehicle approaches the charging/discharging station, for example as of a defined distance, for example 30 to 40 m.

The vehicle is identified by means of a MAC address, for example, and transmission is carried out using a CAN2WiFi module. The identification may comprise for example, statements of vehicle models, vehicle classes and, in particular, also those features which can be used to determine the coordinates of the secondary coil on the vehicle.

The current position of the vehicle is detected, for example, by means of a marking which is fitted to the vehicle or in the environment, for example, or by means of reference values of the vehicle, for example by detecting the specific vehicle contour etc.

Particularly preferably, provision is also made for the vehicle to be navigated to the parking space in step c) either by transmitting coordinates of the parking space relative to the vehicle by means of the first and second communication units, a trajectory from the current position of the vehicle to the parking space being calculated in the vehicle, or by calculating a trajectory from the current position of the vehicle to the parking space in the charging/discharging station and by transmitting the calculated trajectory by means of the first and second communication units.

The driver can park the vehicle in step c) either manually, semi-automatically or automatically, in which case recourse can be had here to a parking assistance system present in the vehicle.

If the charging/discharging station has a plurality of parking spaces, provision is preferably made for the computer device to provide a driver of the vehicle with a selection of the parking spaces after detecting the current position of the vehicle with respect to the plurality of parking spaces. In this case, the driver can select a parking space to which the vehicle is navigated according to step c). If the driver chooses an appropriate parking space, the driver or the driving assistance system receives the coordinates of the primary coil and/or the trajectory via the communication unit, for example via WiFi2CAN. Provision may be made for the positioning target and/or the trajectory to be displayed to the driver using a display, in particular a head-up display, for example. The driver can then park the vehicle either manually, semi-automatically or automatically, in which case recourse can be had here to a parking assistance system present in the vehicle.

According to one development, the computer device also detects an occupancy state of the plurality of parking spaces and provides only free parking spaces for selection.

In the present description, the terms "battery" and "battery-operated" are also used, as is customary in general linguistic usage, for a rechargeable battery and rechargeable-battery-operated. A plurality of battery cells are preferably spatially combined in the battery of the vehicle and are connected to one another by means of circuitry, for example are connected in series or in parallel to form modules in order to be able to provide the required power data. In principle, however, any other electrical energy store is also conceivable, for example supercapacitors.

The invention provides, in particular, a new method for positioning the coils, which allows a particularly low positioning tolerance. The vehicle is precisely navigated to a parking space, with the result that its secondary coil has only a small offset with respect to a primary coil assigned to the parking space. The proposed system is robust and maintenance-free, simple, fast and reliable.

In particular, no additional costs arise for the vehicle since a central camera device is used in the charging station. Since recourse is also had to a camera used in the parking positioning system, no further installation space is required for sensors in the vehicle.

The system is distinguished by a high degree of reliability since it functions, in principle, in darkness, in daylight, and in fog and since environmental influences do not influence the positioning. This system can be advantageously used for parking spaces in which the primary coils are completely embedded in the ground and are completely covered by snow, for example, and therefore cannot be located by the vehicle or by the driver.

An additional benefit of the proposed system arises from the fact that it is also possible to detect persons as a result of the central camera being provided in the charging station and to identify whether the parking space is available as a conventional parking space for other vehicles or is currently being used.

In particular, the camera device and the computer device can be used to monitor the vehicle, that is to say for theft protection.

BRIEF DESCRIPTION OF THE DRAWINGS

Exemplary embodiments of the invention are illustrated in the drawings and are explained in more detail in the following description.

In the drawings

DETAILED DESCRIPTION

In the following description of the exemplary embodiments of the invention, identical or similar components are denoted using identical or similar reference symbols, in which case a repeated description of these components is dispensed with in individual cases. The figures only schematically illustrate the subject matter of the invention.

Figure 1:
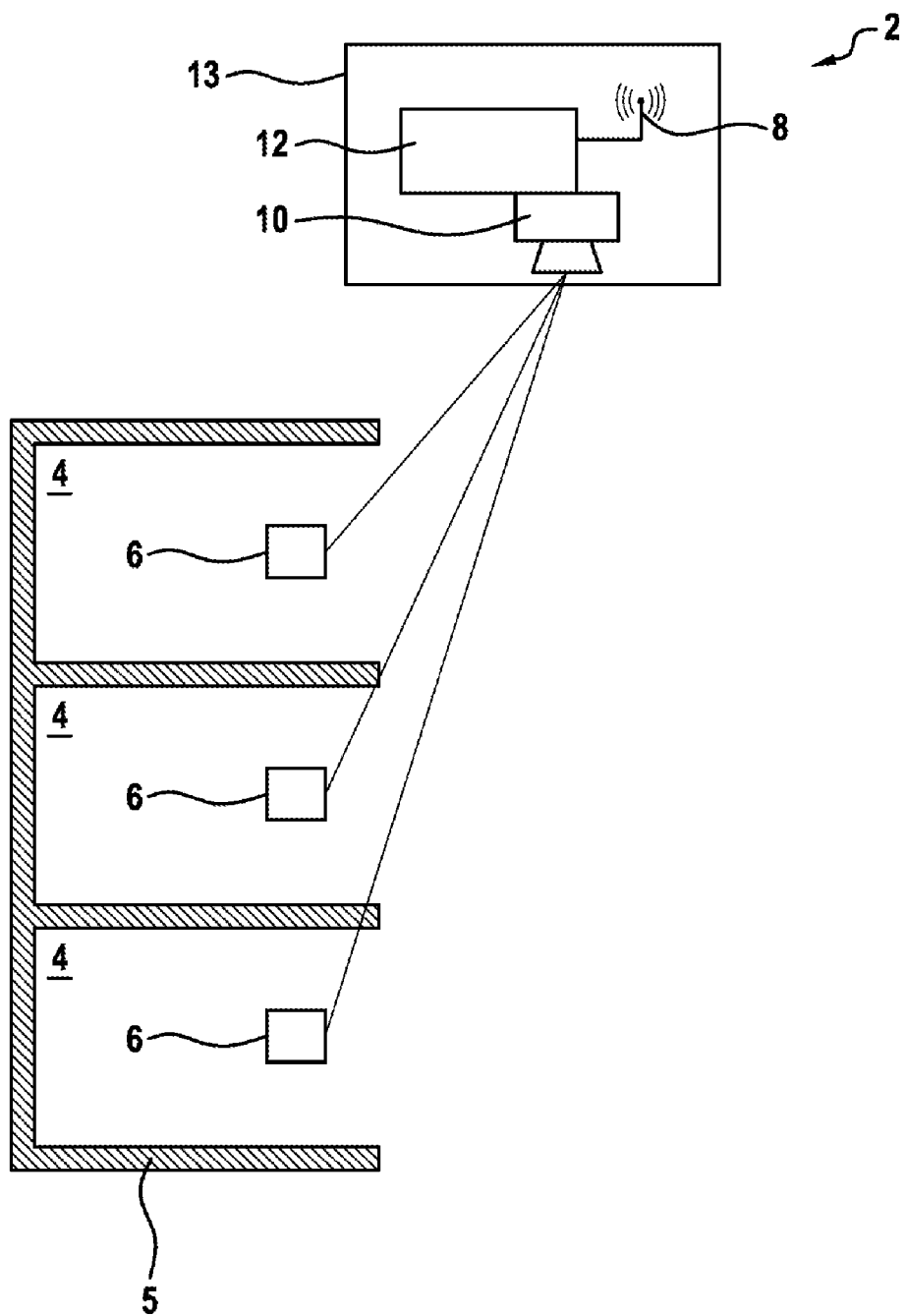
FIG. 1 shows a schematic structure of a charging/discharging station according to one embodiment of the invention.

FIG. 1 shows charging/discharging station 2 according to one embodiment of the invention.

In this exemplary embodiment, the charging/discharging station 2 has three parking spaces 4, each of which is assigned a primary coil 6. The three parking spaces 4 are delimited from one another by means of boundary elements 5, in which case these may be in the form of markings on the ground, for example.

The primary coils 6 are embedded in the ground, for example, or are installed in a charging plate arranged above the ground, depending on the underlying system.

The charging/discharging station 2 also comprises a first communication unit 8 which is connected to a computer device 12. The first communication unit 8 may be based on Bluetooth or WIFI, for example.

The computer device 12 is also connected to a camera device 10, in which case the connection can be implemented in a wireless manner or with the aid of a cable. The camera device 10 is formed by stereo cameras, for example. In the embodiment illustrated, the computer device 12, the camera device 10 and the first communication unit 8 form a system 13 which is positioned with respect to the parking spaces 4 of the charging/discharging station 2 in such a manner that a plan view of the parking spaces 4 is possible, in principle. In particular, provision may be made for the system 13 or parts of the system 13, in particular only the camera device 10 for example, to be in the form of a drone, that is to say to fly autonomously, in particular, and to fly around above the parking spaces 4 according to a defined program, for example, in order to enable a plan view of the parking spaces. In addition, a system 13 or part of a system 13 in the form of a drone preferably also comprises a station (not illustrated) on which the drone is parked at those times at which no identification of the vehicle 14, no detection of a current position of the vehicle 14 and no navigation of the vehicle 14 to the parking space 4 are carried out.

FIG. 1 also illustrates the fact that the primary coils 6 are in the capture range of the camera device 10, with the result that the spatial coordinates of the parking spaces 4 and of the primary coils 6 can be determined and stored in the computer device 12.

Figure 2:
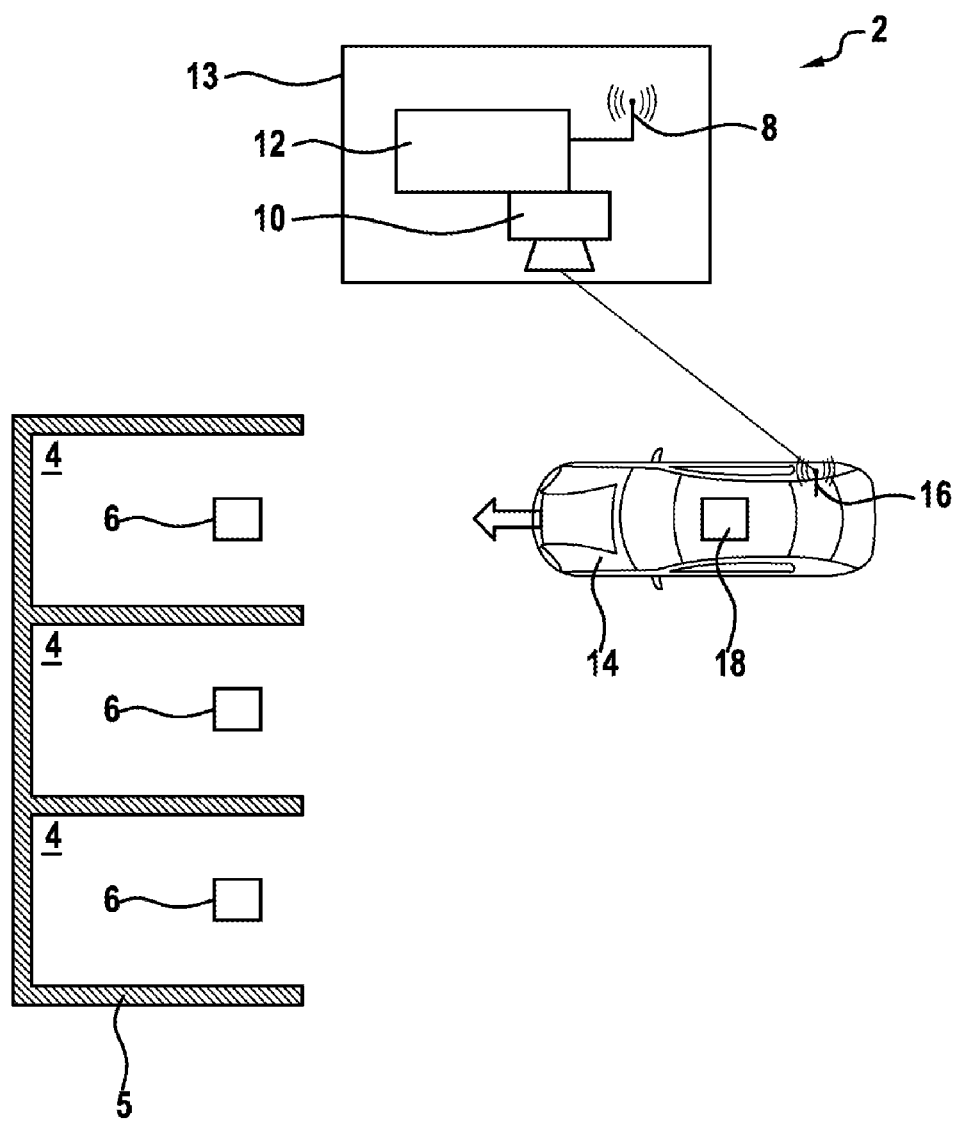
FIG. 2 shows the charging/discharging station from FIG. 1 with an approaching vehicle according to a first embodiment.

FIG. 2 shows the charging/discharging station 2 from FIG. 1, in which case a vehicle 14 which is identified by the computer device 12 is approaching. The identification is carried out, for example, by transmitting a MAC address and/or other relevant vehicle data by means of a second communication unit 16, which is assigned to the vehicle 14, to the first communication unit 8, which is assigned to the computer device 12. A current position of the vehicle 14 with respect to the parking spaces 4 of the charging/discharging station 2 is furthermore also detected by means of the camera device 10. In this case, the image data relating to the vehicle 14 which are recorded by the camera device 10 are transmitted to the computer device 12 which can then determine the coordinates of the parking spaces 4 relative to the vehicle 14 taking into account the known spatial coordinates of the parking spaces 4. The coordinates of the parking spaces 4 relative to the vehicle 14 can be transmitted from the first communication unit 8 to the second communication unit 16 of the vehicle 14, with the result that the trajectories from the current position of the vehicle 14 to the parking spaces 4 can be calculated in the vehicle. Alternatively, the trajectories are calculated by the charging/discharging station 2, for example by means of the computer device 12 illustrated, and the trajectories are finally transmitted to the second communication unit 16 via the first communication unit 8.

Figure 3:
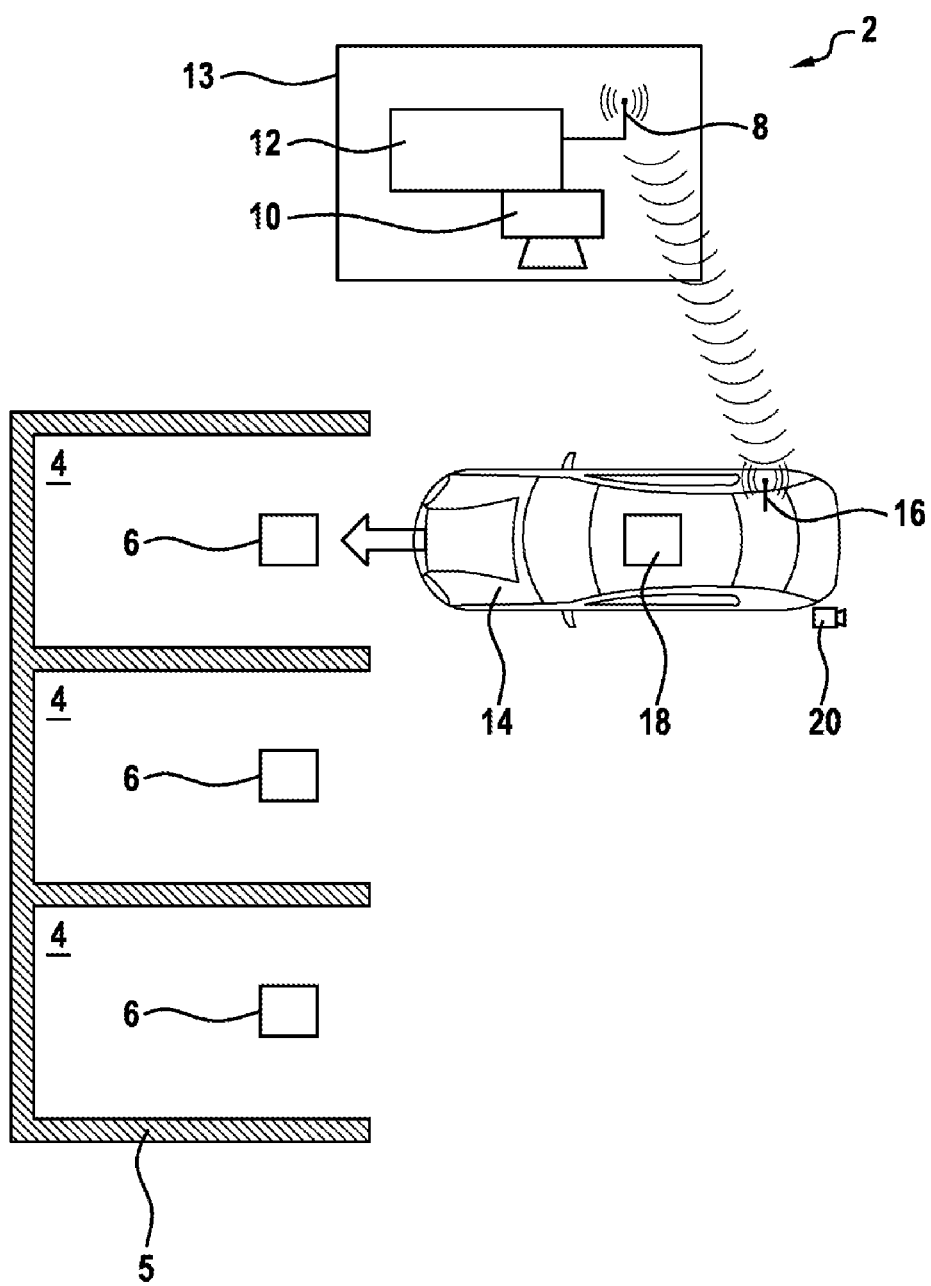
FIG. 3 shows the charging/discharging station from FIG. 1 with an approaching vehicle according to a second embodiment.

FIG. 3 illustrates the system 13 from FIG. 1, in which case the vehicle 14 is equipped here with an additional sensor system 20 which can be assigned to a parking assistant of the vehicle 14, for example. The vehicle 14, in particular a secondary coil 18 in the optimum vicinity of the primary coil 6, is positioned with the aid of the communication via the first communication unit 8 and the second communication unit 16 and possibly additionally with the aid of the sensor system 20.

The invention is not restricted to the exemplary embodiments described here and the aspects highlighted therein. Rather, a multiplicity of modifications within the scope of the practice of a person skilled in the art are possible within the scope indicated by the claims.

The invention claimed is:

1. A charging/discharging station (2) for charging or discharging an at least partially battery-operated vehicle (14)

via an inductively coupled pair of coils, the charging/discharging station (2) comprising
- at least one parking space (4) with a primary coil (6), the primary coil (6) being able to form the inductively coupled pair of coils together with a secondary coil (18) of a vehicle (14) to be discharged and/or charged,
- a first communication unit (8) which is set up to communicate with a second communication unit (16) of the vehicle (14),
- at least one camera device (10) which is connected to a computer device (12) for processing recorded image data, the computer device (12) storing spatial coordinates of the at least one parking space (4), and the computer device (12) having means for navigating the vehicle (14) to the at least one parking space (4) on the basis of image data relating to the vehicle (14) which are recorded by the camera device (10) and the spatial coordinates of the at least one parking space (4) by means of the first and second communication units (8, 16), wherein the camera device flies autonomously above the parking spaces.

2. The charging/discharging station (2) as claimed in claim 1, characterized in that the camera device (10) is positioned with respect to the at least one parking space (4) in such a manner that a plan view of the at least one parking space (4) is possible.

3. The charging/discharging station (2) as claimed in claim 1, characterized in that the camera device (10) is formed by stereo cameras.

4. The charging/discharging station (2) as claimed in claim 1, characterized in that the charging/discharging station (2) has a plurality of parking spaces (4) and the camera device (10) is centrally arranged.

5. A method for operating a charging/discharging station (2) for charging or discharging an at least partially battery-operated vehicle (14) via an inductively coupled pair of coils, the charging/discharging station (2) having at least one parking space (4) with a primary coil (6), the primary coil (6) being able to form the inductively coupled pair of coils together with a secondary coil (18) of a vehicle (14) to be discharged and/or charged, the charging/discharging station (2) having a first communication unit (8) which is set up to communicate with a second communication unit (16) of the vehicle (14), and the charging/discharging station (2) having at least one camera device (10) which is connected to a computer device (12) for the purpose of processing recorded image data, wherein the camera device flies autonomously above the parking spaces, the method comprising the steps of:

a) determining and storing spatial coordinates of the parking space(s) (4) of the charging/discharging station (2) in the computer device (12),
b) identifying the vehicle (14) and detecting a current position of the vehicle (14) with respect to one or more parking spaces (4) of the charging/discharging station (2) by means of image data relating to the vehicle (14) which are recorded by the camera device (10), and
c) navigating the vehicle (14) to a parking space (4) on the basis of the detected current position of the vehicle (14) and the spatial coordinates of the parking space (4) by means of the first and second communication units (8, 16).

6. The method as claimed in claim 5, characterized in that the current position of the vehicle (14) is detected by means of a marking or by means of reference values of the vehicle (14).

7. The method as claimed in claim 5, characterized in that the vehicle (14) is navigated to the parking space (4) in step c)
d) by transmitting coordinates of the parking space (4) relative to the vehicle (14) by means of the first and second communication units (8, 16), a trajectory from the current position of the vehicle (14) to the parking space (4) being calculated in the vehicle.

8. The method as claimed in claim 5, characterized in that the charging/discharging station (2) has a plurality of parking spaces (4), the computer device (12) providing a driver of the vehicle (14) with a selection of the parking spaces (4) after detecting the current position of the vehicle (14) with respect to the plurality of parking spaces (4), and the driver being able to select a parking space (4) to which the vehicle (14) is navigated according to step c).

9. The method as claimed in claim 8, characterized in that the computer device (12) detects an occupancy state of the plurality of parking spaces (4) and provides only free parking spaces (4) for selection.

10. The charging/discharging station (2) as claimed in claim 1, characterized in that the camera device (10) is positioned with respect to the parking space (4) in such a manner that a plan view of the parking space (4) is possible and approach routes of the vehicle (14) are visible.

11. The method as claimed in claim 5, characterized in that the vehicle (14) is navigated to the parking space (4) in step c)
e) by calculating a trajectory from the current position of the vehicle (14) to the parking space (4) in the charging/discharging station (2) and by transmitting the calculated trajectory by means of the first and second communication units (8, 16).

* * * * *